(12) United States Patent
Hur (10) Patent No.: US 8,314,589 B2
(45) Date of Patent: Nov. 20, 2012

(54) BATTERY PACK

(75) Inventor: Jonghwa Hur, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1120 days.

(21) Appl. No.: 12/222,046

(22) Filed: Jul. 31, 2008

(65) Prior Publication Data

US 2009/0111005 A1 Apr. 30, 2009

(30) Foreign Application Priority Data

Oct. 30, 2007 (KR) .................. 10-2007-0109727

(51) Int. Cl.
*H02J 7/00* (2006.01)
*H01M 2/10* (2006.01)
*F21L 4/00* (2006.01)
*H04B 1/38* (2006.01)

(52) U.S. Cl. .......... 320/112; 320/104; 320/132; 429/96; 362/183; 455/573

(58) Field of Classification Search .................. 320/112
See application file for complete search history.

(56) References Cited

U.S. PATENT DOCUMENTS

| | | | |
|---|---|---|---|
| 6,008,627 A | | 12/1999 | Narita |
| 6,075,343 A | * | 6/2000 | Hsu ................ 320/134 |
| 6,492,791 B1 | * | 12/2002 | Saeki et al. .......... 320/135 |
| 6,577,883 B1 | * | 6/2003 | Ueda ............... 455/573 |
| 6,885,168 B2 | * | 4/2005 | Okumura et al. ........ 320/135 |
| 7,436,151 B2 | * | 10/2008 | Wang et al. .......... 320/134 |
| 2006/0076930 A1 | * | 4/2006 | Ooshita et al. ........ 320/134 |
| 2006/0255768 A1 | * | 11/2006 | Yoshio ............ 320/134 |
| 2007/0108940 A1 | * | 5/2007 | Sainomoto et al. ...... 320/112 |
| 2007/0188148 A1 | * | 8/2007 | Kawasumi et al. ....... 320/134 |
| 2007/0210759 A1 | | 9/2007 | Sano et al. |

FOREIGN PATENT DOCUMENTS

CN 1967964 A 5/2007

(Continued)

OTHER PUBLICATIONS

Japanese Office Action issued by Japanese Patent Office on Sep. 7, 2010 corresponding to Korean Patent Application No. 10-2007-0109727 and Request for Entry of the Accompanying Office Action attached herewith.

(Continued)

*Primary Examiner* — Yalkew Fantu
(74) *Attorney, Agent, or Firm* — Robert E. Bushnell, Esq.

(57) ABSTRACT

A battery pack is constructed with a rechargeable battery, a protection circuit part that protects the battery when the battery is charged and discharged, and a switching unit that turns on or off a power source of the protection circuit part. Also, the battery pack may be constructed with a rechargeable battery, a protection circuit part that protects the battery when the battery is charged and discharged, and electric wiring lines constructed so that the power source of the protection circuit part may be turned on and off. When the battery pack is not connected to a charger or a load by the switching unit or the electric wire lines, the power source of the circuit is blocked to prevent the battery pack from being shorted and to reduce the idle power. When the battery pack is connected to the charger or the load, the power source is applied to the circuit so that the circuit operates.

22 Claims, 2 Drawing Sheets

FOREIGN PATENT DOCUMENTS

| | | |
|---|---|---|
| CN | 101055999 A | 10/2007 |
| JP | 07-029554 | 1/1995 |
| JP | 09-266014 | 10/1997 |
| JP | 2000-270485 | 9/2000 |
| JP | 2001-155781 | 6/2001 |
| JP | 2001-155782 | 6/2001 |
| JP | 2002-320334 | 10/2002 |
| JP | 2002320334 A | 10/2002 |
| JP | 2005-192330 | 7/2005 |
| JP | 2005-278371 A | 10/2005 |
| JP | 2006-006006 | 1/2006 |
| JP | 2006-353016 | 12/2006 |
| JP | 2007-128696 | 5/2007 |
| KR | 1020050082872 A | 8/2005 |
| KR | 1020060059679 A | 6/2006 |
| KR | 1020060064829 A | 6/2006 |

OTHER PUBLICATIONS

Chinese Office Action issued by Chinese Patent Office on Nov. 25, 2010 corresponding to Korean Patent Application No. 10-2007-0109727 with English translation attached.

Chinese Office Action issued on Dec. 23, 2011 in the corresponding Chinese patent application No. 200810173626.7.

Japanese Office action issued by JPO on Oct. 4, 2011, corresponding to JP 2008-279913 and Request for Entry attached herewith.

* cited by examiner

// BATTERY PACK

CLAIM OF PRIORITY

This application makes reference to, incorporates the same herein, and claims all benefits accruing under 35 U.S.C. §119 from an application for BATTERY PACK earlier filed in the Korean Intellectual Property Office on 30 Oct. 2007 and there duly assigned Serial No. 10-2007-0109727.

BACKGROUND OF THE INVENTION

1. Field of the Invention

The present invention relates to a battery pack, and more particularly, to a battery pack that is prevented from being shorted and that is capable of reducing idle power.

2. Description of the Related Art

Recently, compact and light electrical and electronic apparatuses such as mobile telephones, notebook computers, and camcorders have been actively developed and produced. Battery packs are built in the portable electrical and electronic apparatuses so that the portable electrical and electronic apparatuses can operate in a space where an additional power source is not provided. The battery packs recently adopt batteries that may be charged and discharged in consideration of economics. The batteries include a nickel-cadmium (Ni—Cd) battery, a nickel-hydrogen (Ni-MH) battery, a lithium (Li) battery, and a lithium ion (Li-ion) battery. In particular, since the operation voltage of the lithium secondary battery is three times higher than the operation voltages of the Ni—Cd battery and the Ni—H battery that are widely used as the contemporary power sources of the portable electronic apparatuses, and the energy density per unit weigh of the lithium ion secondary battery is high, the use of the lithium ion secondary battery rapidly increases.

In the lithium secondary battery, lithium based oxides are used as positive electrode active materials and carbon materials are used as negative electrode active materials. In general, the lithium ion secondary battery is divided into a liquid electrolyte battery and a polymer electrolyte battery in accordance with the kind of an electrolyte. The battery in which the liquid electrolyte is used is referred to as a lithium ion battery and the battery in which the polymer electrolyte is used is referred to as a lithium polymer battery. In addition, the lithium secondary battery is manufactured to have various shapes such as a cylinder type, a square type, and a pouch type.

A protection circuit part is attached to the lithium ion battery such that the lithium ion battery may be selectively charged and discharged, or that power is blocked to protect the lithium ion battery when the lithium ion battery is overcharged or when over-current flows. Therefore, the lithium ion battery is integrated with the protection circuit part to form a pack and is connected to a charger to perform charging or is connected to a portable electronic product that is a load to perform discharging.

At this time, the protection circuit part includes a positive terminal and a negative terminal connected to the charger or the load. When the positive and negative terminals are shorted by a clip or a conductor, the lithium ion battery deteriorates or causes the protection circuit part to abnormally operate.

In addition, the protection circuit part is integrated with the lithium ion battery to form the pack. Although the lithium ion battery is not connected to the charger or the load, the protection circuit part receives power from the lithium ion battery to protect the lithium ion battery so that the power of the lithium ion battery is continuously consumed.

SUMMARY OF THE INVENTION

It is therefore an object of the present invention to provide an improved battery pack.

It is another object of the present invention to provide a battery pack that is capable of preventing positive and negative terminals electrically connected to a charger or a portable electronic product that is a load from being shorted.

It is still another object of the present invention to provide a battery pack that is capable of preventing a protection circuit part from consuming the power of a battery when the battery pack is not connected to a charger or a load.

It is a further object of the present invention to provide a stable battery pack.

According to one aspect of the present invention, a battery pack may be constructed with at least one rechargeable battery, a positive charging and discharging terminal electrically connected to a positive high current path of the battery, a negative charging and discharging terminal electrically connected to a negative high current path of the battery, a charging and discharging switching element electrically connected to a high current path on which the positive charging and discharging terminal or the negative charging and discharging terminal and the battery are electrically connected, a protection circuit part including positive and negative power terminals electrically connected to positive and negative electrodes of the battery to receive power, and electrically connected to the charging and discharging switching element to either turn on or turn off the charging and discharging switching element in accordance with a charging and discharging state of the battery, a switching unit electrically connected in a current path on which the positive and negative power terminals of the protection circuit part are electrically connected to the positive and negative electrodes of the battery, and an auxiliary terminal electrically connected between the switching unit and at least one of a charger and a load when charging or discharging.

The switching unit may be constructed with a switching element. The switching element of the switching unit may electrically connecting either one of the positive power terminal and the negative power terminal in accordance with an on or off signal supplied from the at least one of the charger and the load electrically connected to the auxiliary terminal.

The switching element may be made from either one of a P-type field effect transistor or an N-type field effect transistor.

A first buffer resistor may be electrically coupled between the switching element of the switching unit and the auxiliary terminal.

A second buffer resistor may be electrically coupled between the switching element of the switching unit and the positive charging and discharging terminal.

A reverse current blocking diode may be electrically coupled in parallel with the switching element.

The charging and discharging switching element may include a charging field effect transistor and a discharging field effect transistor. A first parasitism diode for blocking a discharging path may be electrically connected to the source and drain of the charging field effect transistor in parallel. A second parasitism diode for blocking a charging path may be electrically connected between the source and drain of the discharging field effect transistor in parallel.

A first condenser may be electrically coupled between the positive power terminal and the negative power terminal.

A third condenser may be electrically coupled to a high current path of the charging and discharging switching element to absorb an impulse current generated by on and off operations of the charging and discharging switching element.

A second condenser may be electrically coupled between the positive charging and discharging terminal to the negative charging and discharging terminal.

According to another aspect of the present invention, a battery pack may be constructed with at least one rechargeable battery, a positive charging and discharging terminal electrically connected to a positive high current path of the battery, a negative charging and discharging terminal electrically connected to a negative high current path of the battery, a charging and discharging switching element electrically connected in a high current path on which the positive charging and discharging terminal or the negative charging and discharging terminal and the battery are electrically connected, a protection circuit part including positive and negative power terminals that receive power from positive and negative electrodes of the battery, with one of the positive and negative power terminals being electrically connected to the battery and to the charging and discharging switching element to turn on and off the charging and discharging switching element in accordance with charging and discharging states of the battery, and an auxiliary terminal electrically connected to at least one of a charger and a load during charging or discharging. The at least one of the charger and the load may be constructed with a positive terminal and a negative terminal. Either one of the positive and negative terminals of the at least one of the charger and the load may be electrically connected to one electrode of the battery, and the other one of the positive and negative terminals of the at least one of the charger and the load may be electrically connected to the other electrode of the battery to apply a power to the battery.

The charging and discharging switching element may include a charging field effect transistor and a discharging field effect transistor. A parasitism diode for blocking a discharging path maybe connected to the source and drain of the charging field effect transistor in parallel. And a parasitism diode for blocking a charging path may be connected to the source and drain of the discharging field effect transistor in parallel.

A third condenser may be electrically connected to the high current path of the charging and discharging switching element to absorb an impulse current generated by on and off operations of the charging and discharging switching element.

A first condenser may be electrically coupled between the positive power terminal and the negative power terminal.

A second condenser may be electrically coupled between the negative charging and discharging terminal and the positive charging and discharging terminal.

A buffer resistor may be electrically coupled between one of the positive power terminal and the negative power terminal and the auxiliary terminal.

According still another aspect of the present invention, a battery pack may be constructed with at least one rechargeable battery, a positive charging and discharging terminal electrically connected to a positive high current path of the battery, a negative charging and discharging terminal electrically connected to a negative high current path of the battery, a charging and discharging switching element electrically connected in a high current path on which either one of the positive charging and discharging terminal and the negative charging and discharging terminal and the battery are electrically connected, a protection circuit part including positive and negative power terminals that receive power from positive and negative electrodes of the battery, and electrically connected to the charging and discharging switching element to turn on and off the charging and discharging switching element in accordance with charging and discharging states of the battery, a first auxiliary terminal electrically connected to at least one of a charger and a load during charging or discharging and electrically connected to the positive power terminal, and a second auxiliary terminal electrically connected to the at least one of the charger and the load during charging or discharging and electrically connected to the negative power terminal.

The charging and discharging switching element may include a charging field effect transistor and a discharging field effect transistor. A parasitism diode for blocking a discharging path may be connected to the source and drain of the charging field effect transistor in parallel. A parasitism diode for blocking a charging path may be connected to the source and drain of the discharging field effect transistor in parallel.

A third condenser may be electrically coupled to a high current path of the charging and discharging switching element to absorb an impulse current generated by on or off operations of the charging and discharging switching element.

A first condenser may be electrically coupled between the positive power terminal and the negative power terminal.

A second condenser electrically may be coupled between the negative charging and discharging terminal and the positive charging and discharging terminal.

A buffer resistor may be electrically coupled between one of the positive power terminal and the negative power terminal and the auxiliary terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. In the entire description of the present invention, the same drawing reference numerals are used for the same elements across various figures. Also, the same elements across various figures are not explained again as possible. In the exemplary embodiments of the present invention, a charger or a load of a portable electronic product that is connected to a battery pack according to the present invention are described. At this time, the charger and the load of the portable electronic product include terminals connected to the battery pack and the terminals may vary in accordance with the structure of the battery pack.

Figure 1:
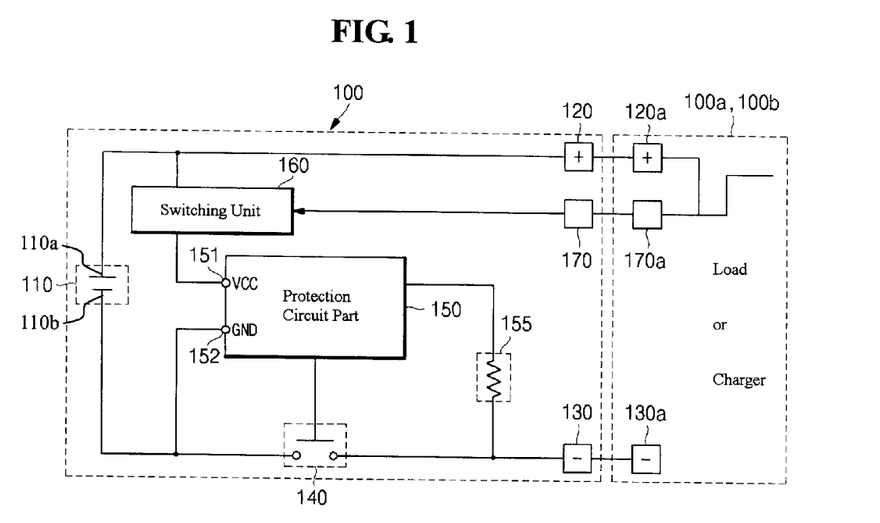
FIG. 1 is a circuit diagram of a battery pack according to a first embodiment of the principles the present invention.

FIG. 1 is a circuit diagram of a battery pack according to a first embodiment of the principles of the present invention.

Referring to FIG. 1, a battery pack 100 according to the present invention includes a battery 110, a positive charging and discharging terminal 120, a negative charging and discharging terminal 130, a charging and discharging switching element 140, a protection circuit part 150, a switching unit 160, and an auxiliary terminal 170.

Battery 110 is rechargeable and may be one or more. And, battery 110 may be a lithium ion battery or a lithium polymer battery.

Positive charging and discharging terminal 120 is electrically connected to positive electrode 110a, i.e., a negative high current path of battery 110. Positive charging and discharging terminal 120 may be electrically connected to terminal 120a of a charger 100a or a load 100b. The high current path is the path that is electrically connected to the positive electrode and the negative electrode of the battery. The charging and discharging current flows through the high current path.

Negative charging and discharging terminal 130 is electrically connected to negative electrode 110b, i.e., a positive high current path of battery 110. Negative charging and discharging terminal 130 may be electrically connected to terminal 130a of charger 100a or load 100b, or may be electrically connected to a ground.

Charging and discharging switching element 140 is electrically connected to a high current path to which positive charging and discharging terminal 120 or negative charging and discharging terminal 130 and battery 110 are electrically connected. Charging and discharging switching element 140 may be made from an electronic element that performs a switching function such as a field effect transistor or a transistor. In addition, charging and discharging switching element 140 may be divided into a charging switching element that flows current in a charging direction and a discharging switching element that flows current in a discharging direction. That is, charging and discharging switching element 140 illustrated in FIG. 1 is for convenience sake and may be one or more.

Protection circuit part 150 includes a positive power terminal 151 and a negative power terminal 152 that receive power from positive electrode 110a and negative electrode 110b of battery 110. Protection circuit part 150 is electrically connected to positive and negative electrodes 110a, 110b of battery 110 and charging and discharging switching element 140 to turn on and off charging and discharging switching element 140 in accordance with charging and discharging states of battery 110. When charger 100a or load 100b is electrically connected to positive and negative charging and discharging terminals 120 and 130 to perform charging and discharging function, protection circuit part 150 detects over-current by an over-current detecting unit (not shown) of protection circuit part 150, turns off charging and discharging switching element 140, and thus preventing battery 110 from being overheated and exploded. At this time, the over-current detecting unit of protection circuit part 150 may be electrically connected to the high current path of battery 110 by a buffer resistor 155 that buffers impulse current. Protection circuit part 150 may further include a functioning unit (not shown) that detects the voltage and current of battery 110. In the present invention, however, the additional functions of protection circuit part 150 are not limited.

Switching unit 160 may be electrically connected between a path on which positive and negative power terminals 151 and 152 of protection circuit part 150 are electrically connected to the positive and negative electrodes of battery 110.

In FIG. 1, switching unit 160 is formed between a path on which positive power terminal 151 and positive electrode 110a of battery 110 are electrically connected to each other in a state where negative power terminal 152 and negative electrode 110b of battery 110 are electrically connected to each other. Alternatively, switching unit 160 may be formed between a path on which negative power terminal 152 of protection circuit part 150 and negative electrode 110b of battery 110 are electrically connected to each other in a state where positive power terminal 151 of protection circuit part 150 and positive electrode 110a of battery 110 are electrically connected to each other. Switching unit 160 may be made from an electronic element that performs the switching function such as a transistor or a field effect transistor, and may be turned on by a signal input through auxiliary terminal 170. Therefore, positive power terminal 151 or negative power terminal 152 of protection circuit part 150 may be electrically connected to positive or negative electrode 110a or 110b of battery 110 to drive protection circuit part 150.

Auxiliary terminal 170 is electrically connected to charger 100a or load 100b when charging or discharging battery 110, and is electrically connected switching unit 160. When auxiliary terminal 170 is electrically connected to the other connection terminals 120a, 130a, and 170a of charger 100a or load 100b together with positive and negative charging and discharging terminals 120 and 130, a signal output from charger 100a or load 100b is supplied to switching unit 160 through auxiliary terminal 170. Switching unit 160 electrically connects positive electrode 110a of battery 110 and positive power terminal 151 of protection circuit part 150 to each other to supply power to protection circuit part 150.

The above-described battery pack 100 may supply power to or block power from protection circuit part 150 by switching unit 160 that electrically connects one of positive and negative power terminals 151 and 152 of protection circuit part 150 and one of positive and negative electrodes 110a and 110b of battery 110 to each other. At this time, switching unit 160 is electrically connected to auxiliary terminal 170. When auxiliary terminal 170 is electrically connected to the terminal of charger 100a or load 100b, switching unit 160 is operated by a signal input to charger 100a or load 100b to electrically connect positive electrode 110a of battery 110 and positive power terminal 151 of protection circuit part 150 to each other. Therefore, switching unit 160 supplies power from battery 110 to protection circuit part 150 so that protection circuit part 150 starts to operate. In addition, when terminals 120a, 170a, and 130a of charger 100a or load 100b and battery pack 100 are not connected to each other, because protection circuit part 150 does not receive power from battery 110, it is possible to prevent protection circuit part 150 from consuming the power of battery 110. In addition, when positive and negative charging and discharging terminals 120 and 130 are shorted, since protection circuit part 150 does not perform the charging and discharging function, charging and discharging switching element 140 is turned off. Therefore, battery 110 is not shorted.

Figure 2:
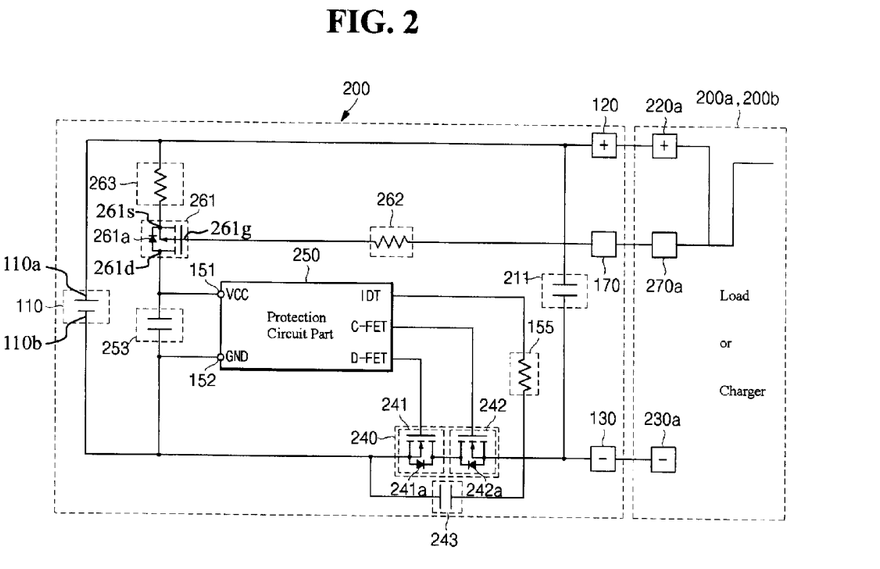
FIG. 2 is a circuit diagram of a battery pack according to a second embodiment of the principles of the present invention.

FIG. 2 is a circuit diagram of the battery pack according to a second exemplary embodiment of the principles of the present invention.

Referring to FIG. 2, battery pack 200 according to the second exemplary embodiment of the present invention includes battery 110, positive charging and discharging terminal 120, negative charging and discharging terminal 130, charging and discharging switching element 240, protection circuit part 250, a switching element 261, and auxiliary terminal 170. According to the second exemplary embodiment, since the structures of and the connection relationship between battery 110, positive charging and discharging terminal 120, and negative charging and discharging terminal 130 are the same as those according to the above-described exemplary embodiment, description thereof will be omitted.

First, the above-described switching unit may include switching element 261. Switching element 261 is turned on by an on or off signal output from charger 200a or load 200b which is electrically connected to auxiliary terminal 170 so that positive power terminal 151 and positive electrode 110a of battery 110 may be electrically connected to each other. Switching element 261 may be made from a transistor or a field effect transistor. Since switching element 261 is a semiconductor switching element, switching element 261 is turned on or off by a small signal voltage or current received from auxiliary terminal 170 at high response speed to perform the switching function.

Also, switching element 261 may be made from a field effect transistor and a P-type field transistor or an N-type field transistor. When switching element 261 is made from the field effect transistor, a voltage is applied to auxiliary terminal 170 to which a gate electrode of switching element 261 is connected, and then positive charging and discharging terminal 120 to which a source electrode of switching element 261 is electrically connected, is changed to turn on switching element 261 and to thus supply power to protection circuit part 250.

In addition, a first buffer resistor 262 may be formed to electrically connects the gate electrode of switching element 261 to auxiliary terminal 170. When charger 200a or load 200b is connected to battery pack 200 so that positive charging and discharging terminal 120 and auxiliary terminal 170 are shorted, first buffer resistor 262 causes a difference in a voltage between the gate and the source so that the field effect transistor, i.e., switching element 261, may be turned on.

In addition, a second buffer resistor 263 may be formed between source electrode 261s of switching element 261 formed of the field effect transistor and positive charging and discharging terminal 120. When charger 200a or load 200b is connected to battery pack 200 so that positive charging and discharging terminal 120 and auxiliary terminal 170 are shorted, second buffer resistor 263 causes a difference in a voltage between gate electrode 261g and source electrode 261s so that the field effect transistor is turned on. In addition, second buffer resistor 263 may adjust the operating voltage of protection circuit part 250.

In addition, when switching element 261 is formed of the field effect transistor, a reverse current blocking diode 261a may be formed between source electrode 261s and drain electrode 261d of switching element 261 in parallel to block current received from battery 110. At this time, in order to block the current received by battery 110, reverse current blocking diode 261a may be connected so that the direction in which the current is received by battery 110 is reversed as illustrated in FIG. 2.

On the other hand, charging and discharging switching element 240 may be divided into a charging field effect transistor 242 and a discharging field effect transistor 241. In this case, a parasitism diode 242a for blocking a discharging path may be connected to the source and drain of charging field effect transistor 242 in parallel. In addition, a parasitism diode 241a for blocking a charging path may be connected to the source and drain of discharging field effect transistor 241 in parallel. In this case, in order to block the current that flows to a discharging path during charging, parasitism diode 242a for blocking the discharging path may be connected in the reverse direction of the current that flows to the discharging path. In order to block the current that flows to a charging path during discharging, parasitism diode 241a for blocking the charging path may be connected in the reverse direction of the current that flows to the charging path. Since the charging path and the discharging path are in the opposite directions, the charging path and the discharging path may be reversed when the polarity of battery 110 changes. In FIG. 2, the discharging path is in a clockwise direction and the charging path is in a counter-clockwise direction.

On the other hand, in protection circuit part 250 that controls charging field effect transistor 242 and discharging field effect transistor 241, positive power terminal 151 and negative power terminal 152 are electrically connected to positive and negative electrodes 110a and 110b of battery 110 to measure the voltage of battery 110 and to thus control charging field effect transistor 242 and discharging field effect transistor 241. In this case, when charger 200a is electrically connected to positive charging and discharging terminal 120 and negative charging and discharging terminal 130, protection circuit part 250 senses the initial charging voltage of charger 200a to turn on charging switching element 242, and thus charging battery 110. When load 200b is electrically connected to positive charging and discharging terminal 120 and negative charging and discharging terminal 130, discharging switching element 241 is turned on to discharge battery 110.

In addition, a first condenser 253 may be formed to electrically connect positive power terminal 151 with negative power terminal 152. First condenser 253 attenuates static electricity received from the outside or an impulse voltage or current to protect protection circuit part 250. In addition, first condenser 253 may absorb the impulse voltage and current that are generated when terminals 270a and 230a of charger 200a or load 200b are connected to auxiliary terminal 170 and negative charging and discharging terminal 130.

In addition, a condenser 243 may be formed in charging and discharging switching element 240 to absorb instantaneous impulse current generated by the on and off operations of charging and discharging switching element 240.

In addition, a second condenser 211 may be further formed to electrically connect positive charging and discharging terminal 120 and negative charging and discharging terminal 130 to each other. Second condenser 211 may absorb the impulse voltage and current that are generated when terminals 220a and 230a of charger 200a or load 200b are electrically connected to positive charging and discharging terminal 120 and negative charging and discharging terminal 130. Here, in comparison to the high current path that is electrically connected to the positive electrode and the negative electrode of the battery, a low current path is the path through which the control signal passing in or out of the protection circuit part flows, e.g., the path electrically connecting protection circuit part 250 and the charging and discharging switching element 240.

Figure 3:
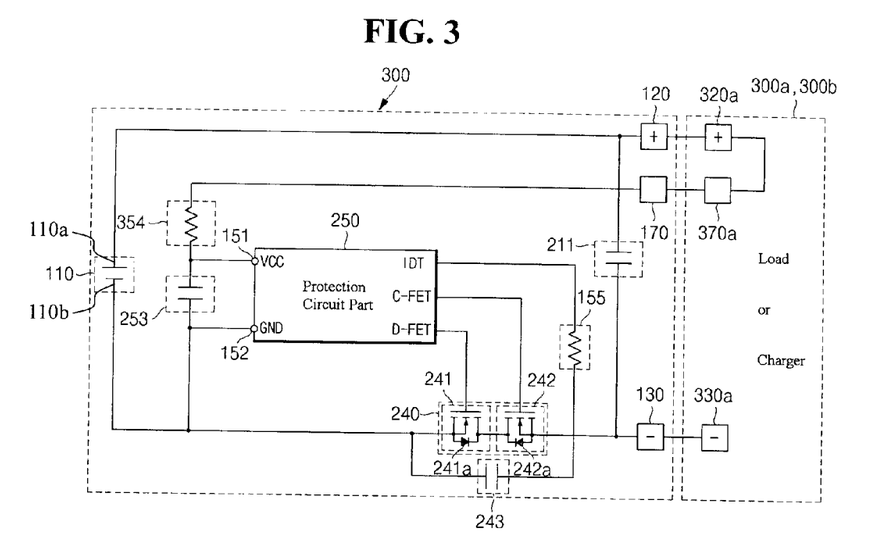
FIG. 3 is a circuit diagram of a battery pack according to a third embodiment of the principles of the present invention.

FIG. 3 is a circuit diagram of a battery pack according to a third exemplary embodiment according to the principles of the present invention.

Referring to FIG. 3, battery pack 300 according to the third exemplary embodiment of the present invention includes battery 110, positive charging and discharging terminal 120, negative charging and discharging terminal 130, protection circuit part 250, and an auxiliary terminal 170. Since the structures of and the connection relationship between battery 110, positive charging and discharging terminal 120, negative charging and discharging terminal 130, and charging and discharging switching element 240 are the same as those according to the above-described exemplary embodiment, description thereof will be omitted.

The structure and function of protection circuit part 250 may be the same as those according to the above-described exemplary embodiment. When the connection relationship is described, however, one of positive and negative power terminals 151 and 152 that receive power from positive and negative electrodes 110a and 110b of battery 110 may be electrically connected to battery 110 and the other one of positive and negative power terminals 151 and 152 may be electrically connected to auxiliary terminal 170. In FIG. 3, negative power terminal 152 is electrically connected to negative electrode 110b of battery 110, whereas positive power terminal 151 is electrically connected to auxiliary terminal 170. Alternatively, although not shown in FIG. 3, negative power terminal 152 may be electrically connected to auxiliary terminal 170 and positive power terminal 152 may be electrically connected to positive electrode 110a of battery 110. Terminals 320a and 370a of charger 300a or load 300b are connected to battery pack 300 having the above-described connection relationship so that auxiliary terminal 170 and positive charging and discharging terminal 120 of battery pack 300 are shorted. Then, a power source is supplied to protection circuit part 250 so that protection circuit part 250 operates to control charging and discharging switching element 240. Therefore, when terminals 320a and 370a of charger 300a or load 300b that short auxiliary terminal 170 and positive charging and discharging terminal 120 are not connected, since protection circuit part 250 does not receive power, charging and discharging switching element 240 is cut off. As a result, although the two terminals of positive and negative charging and discharging terminals 120 and 130 are shorted, battery 110 is not damaged. In addition, since protection circuit part 250 does not receive power from battery 110, battery 110 does not consume power. Therefore, although battery 110 is left for a long time in a state where battery 110 is not connected to the charger or the load, protection circuit part 250 does not consume power so that it takes long to fully discharge battery 110.

At this time, first condenser 253 may be further provided to electrically connect positive power terminal 151 and negative power terminal 152 to each other. First condenser 253 absorbs the surge voltage or the impulse current that is received between positive power terminal 151 and negative power terminal 152 and removes noise received by positive charging and discharging terminal 151 and auxiliary terminal 170 to stabilize the power supplied to positive power terminal 151 and negative power terminal 152 of protection circuit part 250.

In addition, second condenser 211 may be further provided to electrically connect negative charging and discharging terminal 130 and positive charging and discharging terminal 120 to each other. Second condenser 211 absorbs the surge voltage or the impulse current received between negative charging and discharging terminal 130 and positive charging and discharging terminal 170.

In addition, a buffer resistor 354 may be electrically connected to a path where auxiliary terminal 170 and positive power terminal 151 are electrically connected. Alternatively, unlike in FIG. 3, when auxiliary terminal 170 is electrically connected to negative power terminal 152 in a state where positive power terminal 151 is electrically connected to positive electrode of battery 110, buffer resistor 354 may be connected between auxiliary terminal 170 and negative power terminal 152. Buffer resistor 354 may reduce the voltage applied to positive power terminal 151 or negative power terminal 152 of protection circuit part 250 or can buffer the impulse current received through auxiliary terminal 170.

Figure 4:
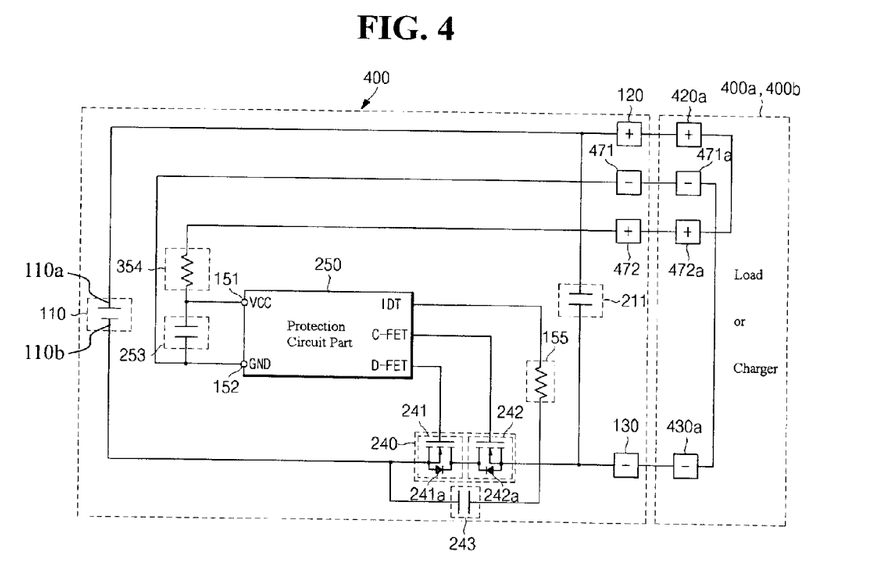
FIG. 4 is a circuit diagram of a battery pack according to a fourth embodiment of the principles of the present invention.

FIG. 4 is a circuit diagram of a battery pack according to a fourth exemplary embodiment of the principles of the present invention.

Referring to FIG. 4, battery pack 400 according to still another exemplary embodiment includes battery 110, positive charging and discharging terminal 120, negative charging and discharging terminal 130, charging and discharging switching element 240, protection circuit part 250, a first auxiliary terminal 471, and a second auxiliary terminal 472. According to the fourth embodiment, since the structures of and the connection relationship between battery 110, positive charging and discharging terminal 120, negative charging and discharging terminal 130, charging and discharging switching element 240, first condenser 253, second condenser 211, and buffer resistor 354 are the same as those according to the above-described exemplary embodiment, description thereof will be omitted.

First, the structure and function of protection circuit part 250 may be the same as those according to the above-described exemplary embodiment. Negative power terminal 152 formed in protection circuit part 250, however, is electrically connected to first auxiliary terminal 471, and positive power terminal 151 is electrically connected to second auxiliary terminal 472. At this time, terminals 430a and 471a of charger 400a or load 400b are connected to first auxiliary terminal 471 and negative charging and discharging terminal 130 to short first auxiliary terminal 151 and negative charging and discharging terminal 130, and the other terminals 420a and 472a of charger 400a or load 400b short second auxiliary terminal 472 and positive charging and discharging terminal 120. Therefore, power is supplied to protection circuit part 250, and protection circuit part 250 operates charging and discharging switching element 240 to protect battery 110 when battery 110 performs charging and discharging. In addition, when charger 400a or load 400b is not connected to positive and negative charging and discharging terminal 120 and first and second auxiliary terminals 471 and 472, a power source is blocked between positive and negative power terminals 151 and 152 of protection circuit part 250 and the positive and negative electrodes of battery 110. Therefore, when charger 400a or load 400b and battery pack 400 are not connected to each other, since protection circuit part 250 does not receive the power source from battery 110, protection circuit part 250 does not consume the power of battery 110. At this time, battery 110 may be shorted only when positive and negative charging and discharging terminal 130 and first and second auxiliary terminals 471 and 472 are all shorted. That is, when one of positive and negative charging and discharging terminal 130 and first and second auxiliary terminals 471 and 472 is not shorted, it is possible to prevent battery 110 from being shorted.

When the battery pack according to the present invention is not electrically connected to the charger or the portable electronic product that is the load, the positive and negative charging and discharging terminals are not shorted.

In addition, when the battery pack is not connected to the charger or the load, the protection circuit part does not consume the power of the battery.

In addition, the battery pack stably operates at the moment when the above-described effects are achieved.

Although a few exemplary embodiments of the present invention have been shown and described, it would be appreciated by those skilled in the art that changes might be made in this exemplary embodiment without departing from the principles and spirit of the invention, the scope of which is defined in the claims and their equivalents.

What is claimed is:

1. A battery pack, comprising:
    at least one rechargeable battery;
    a positive charging and discharging terminal electrically connected to a positive electrode of the battery;
    a negative charging and discharging terminal electrically connected to a negative electrode of the battery;
    a charging and discharging switching element electrically connected in a high current path either between the positive charging and discharging terminal and the battery or between the negative charging and discharging terminal and the battery, and a charging and discharging current flowing through the charging and discharging switching element;
    a protection circuit part comprising positive and negative power terminals electrically connected to positive and negative electrodes of the battery, respectively, to receive power, and being electrically connected to the charging and discharging switching element to either turn on or turn off the charging and discharging switching element in accordance with a charging and discharging state of the battery;
    a switching unit electrically connected in one of a first current path between the positive power terminal of the protection circuit part and the positive electrode of the battery, and a second current path between the negative power terminal of the protection circuit part and the negative electrode of the battery, and an electrical current flowing from the battery to the protection circuit part through the switching unit; and
    an auxiliary terminal electrically connected between the switching unit and at least one of a charger and a load during charging or discharging.

2. The battery pack as claimed in claim 1, comprised of the switching unit comprising a switching element, with the switching element of the switching unit electrically connecting either one of the positive power terminal and the negative power terminal of the protection circuit part in accordance with an on or off signal supplied from the at least one of the charger and the load electrically connected to the auxiliary terminal.

3. The battery pack as claimed in claim 2, comprised of the switching element being made from either one of a P-type field effect transistor or an N-type field effect transistor.

4. The battery pack as claimed in claim 2, comprised of a first buffer resistor electrically coupled between the switching element of the switching unit and the auxiliary terminal.

5. The battery pack as claimed in claim 2, comprised of a second buffer resistor electrically coupled between the switching element of the switching unit and the positive charging and discharging terminal.

6. The battery pack as claimed in claim 2, comprised of a reverse current blocking diode electrically coupled in parallel with the switching element.

7. The battery pack as claimed in claim 1, comprised of:
    the charging and discharging switching element comprising a charging field effect transistor and a discharging field effect transistor;
    a first parasitism diode for blocking a discharging path being electrically connected to the source and drain of the charging field effect transistor in parallel; and
    a second parasitism diode for blocking a charging path being electrically connected to the source and drain of the discharging field effect transistor in parallel.

8. The battery pack as claimed in claim 1, comprised of a first condenser electrically coupled between the positive power terminal and the negative power terminal.

9. The battery pack as claimed in claim 1, comprised of a third condenser electrically coupled to a high current path of the charging and discharging switching element to absorb an impulse current generated by on and off operations of the charging and discharging switching element.

10. The battery pack as claimed in claim 1, comprised of a second condenser electrically coupled between the positive charging and discharging terminal to the negative charging and discharging terminal.

11. A battery pack, comprising:
    at least one rechargeable battery;
    a positive charging and discharging terminal electrically connected to a positive electrode of the battery;
    a negative charging and discharging terminal electrically connected to a negative electrode of the battery;
    a charging and discharging switching element electrically connected in a high current path either between the positive charging and discharging terminal and the battery or between the negative charging and discharging terminal and the battery. and a charging and discharging current flowing through the charging and discharging switching element;
    a protection circuit part comprising positive and negative power terminals that receive power from positive and negative electrodes of the battery, with one of the positive and negative power terminals being electrically connected to the battery and to the charging and discharging switching element to turn on and off the charging and discharging switching element in accordance with charging and discharging states of the battery; and
    an auxiliary terminal electrically connected to at least one of a charger and a load during charging or discharging, and electrically connected to one of the positive and negative power terminals of the protection circuit part which is not electrically connected to the battery.

12. The battery pack as claimed in claim 11, comprised of:
    the charging and discharging switching element comprising a charging field effect transistor and a discharging field effect transistor,
    a parasitism diode for blocking a discharging path being connected to the source and drain of the charging field effect transistor in parallel, and
    a parasitism diode for blocking a charging path being connected to the source and drain of the discharging field effect transistor in parallel.

13. The battery pack as claimed in claim 11, comprised of a third condenser electrically connected to the high current path of the charging and discharging switching element to absorb an impulse current generated by on and off operations of the charging and discharging switching element.

14. The battery pack as claimed in claim 11, comprised of a first condenser electrically coupled between the positive power terminal and the negative power terminal.

15. The battery pack as claimed in claim 11, comprised of a second condenser electrically coupled between the negative charging and discharging terminal and the positive charging and discharging terminal.

16. The battery pack as claimed in 11, comprised of a buffer resistor electrically coupled between one of the positive power terminal and the negative power terminal and the auxiliary terminal.

17. A battery pack, comprising:
    at least one rechargeable battery;
    a positive charging and discharging terminal electrically connected to a positive electrode of the battery;
    a negative charging and discharging terminal electrically connected to a negative electrode of the battery;

a charging and discharging switching element electrically connected in a high current path either between the positive charging and discharging terminal and the battery or between the negative charging and discharging terminal and the battery. and a charging and discharging current flowing through the charging and discharging switching element;

a protection circuit part comprising positive and negative power terminals that receive power from positive and negative electrodes of the battery, and electrically connected to the charging and discharging switching element to turn on and off the charging and discharging switching element in accordance with charging and discharging states of the battery;

a first auxiliary terminal electrically connected to at least one of a charger and a load during charging or discharging and electrically connected to the positive power terminal; and a second auxiliary terminal electrically connected to the at least one of the charger and the load during charging or discharging and electrically connected to the negative power terminal.

18. The battery pack as claimed in claim 17, comprised of:

the charging and discharging switching element comprising a charging field effect transistor and a discharging field effect transistor, a parasitism diode for blocking a discharging path being connected to the source and drain of the charging field effect transistor in parallel, and a parasitism diode for blocking a charging path being connected to the source and drain of the discharging field effect transistor in parallel.

19. The battery pack as claimed in claim 17, comprised of a third condenser electrically coupled to a high current path of the charging and discharging switching element to absorb an impulse current generated by on or off operations of the charging and discharging switching element.

20. The battery pack as claimed in claim 17, comprised of a first condenser electrically coupled between the positive power terminal and the negative power terminal.

21. The battery pack as claimed in claim 17, comprised of a second condenser electrically coupled between the negative charging and discharging terminal and the positive charging and discharging terminal.

22. The battery pack as claimed in 17, comprised of a buffer resistor electrically coupled between one of the positive power terminal and the negative power terminal and the auxiliary terminal.

* * * * *